(12) United States Patent
Gonzalez et al.

(10) Patent No.: US 11,430,227 B2
(45) Date of Patent: Aug. 30, 2022

(54) METHOD, COMPUTER PROGRAM PRODUCT, AND DRIVER ASSISTANCE SYSTEM FOR DETERMINING ONE OR MORE LANES OF A ROAD IN AN ENVIRONMENT OF A VEHICLE

(71) Applicant: Bayerische Motoren Werke Aktiengesellschaft, Munich (DE)

(72) Inventors: Orland Gonzalez, Munich (DE); Josef Mehringer, Gmund (DE); Christoph Pietruska, Munich (DE); Sebastian Rass, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 253 days.

(21) Appl. No.: 16/688,611

(22) Filed: Nov. 19, 2019

(65) Prior Publication Data
US 2020/0167576 A1 May 28, 2020

(30) Foreign Application Priority Data

Nov. 23, 2018 (EP) .................................... 18207969

(51) Int. Cl.
*G06V 20/56* (2022.01)
*B60W 60/00* (2020.01)
(Continued)

(52) U.S. Cl.
CPC ........... *G06V 20/588* (2022.01); *B60W 30/12* (2013.01); *B60W 30/165* (2013.01);
(Continued)

(58) Field of Classification Search
CPC ........ G06K 9/00798; B60W 60/00276; B60W 60/00272; B60W 60/00274; B60W 40/04; B60W 40/06
(Continued)

(56) References Cited

U.S. PATENT DOCUMENTS

| 2010/0076684 | A1* | 3/2010 | Schiffmann | ........... G01S 13/867 701/301 |
| 2011/0235864 | A1* | 9/2011 | Shimizu | ................ G08G 1/163 382/103 |

(Continued)

FOREIGN PATENT DOCUMENTS

WO    WO 2016/090571 A1    6/2016

OTHER PUBLICATIONS

Guo et al., "Improved Lane Detection based on Past Vehicle Trajectories," 17th International IEEE Conference on Intelligent Transportation Systems (ITSC), IEEE, Oct. 8, 2014, pp. 1956-1963, XP032685535 (eight (8) pages). (Year: 2014).*

(Continued)

*Primary Examiner* — Scott A Reinbold
(74) *Attorney, Agent, or Firm* — Crowell & Moring LLP (57) ABSTRACT

A method determines one or more lanes of a road in an environment of a vehicle, by receiving a plurality of objects in the environment of the vehicle; receiving a plurality of trajectories of the plurality of objects in the environment of the vehicle; estimating a shape of a road based on the plurality of trajectories of the plurality of objects; and determining one or more lanes of the road using the estimated shape of the road and the plurality of objects and/or the plurality of trajectories of the plurality of objects.

14 Claims, 7 Drawing Sheets

(51) Int. Cl.
  *B60W 40/04*   (2006.01)
  *B60W 40/06*   (2012.01)
  *B60W 30/12*   (2020.01)
  *B60W 30/165*  (2020.01)

(52) U.S. Cl.
  CPC ............ *B60W 40/04* (2013.01); *B60W 40/06* (2013.01); *B60W 60/00272* (2020.02); *B60W 60/00274* (2020.02); *B60W 60/00276* (2020.02); *B60W 2552/53* (2020.02)

(58) Field of Classification Search
  USPC .......................................................... 382/104
  See application file for complete search history.

(56) References Cited

U.S. PATENT DOCUMENTS

| | | | | |
|---|---|---|---|---|
| 2017/0008521 | A1* | 1/2017 | Braunstein | G05D 1/0219 |
| 2017/0322314 | A1* | 11/2017 | Yang | G01S 5/0072 |
| 2018/0024562 | A1* | 1/2018 | Bellaiche | G06V 20/588 |
| | | | | 701/26 |
| 2018/0237012 | A1* | 8/2018 | Jammoussi | G01C 21/3415 |
| 2018/0281790 | A1* | 10/2018 | Oyama | G05D 1/0274 |

OTHER PUBLICATIONS

International Search Report (PCT/ISA/210) issued in PCT Application No. PCT/EP2019/063856 dated Oct. 11, 2019 (eight (8) pages).

Written Opinion (PCT/ISA/237) issued in PCT Application No. PCT/EP2019/063856 dated Oct. 11, 2019 (eight (8) pages).

European Search Report issued in counterpart European Application No. 18207969.9 dated Jul. 24, 2019 (five (5) pages).

Klotz et al., "Lane data fusion for driver assistance systems," Proceedings of the International Conference on Information FU, XX, XX, Jan. 1, 2004, pp. 657-663, vol. 2, XP009082998 (seven (7) pages).

Polychronopoulos et al., "Extended path prediction using camera and map data for lane keeping support," 2005 IEEE Intelligent Transportation Systems Conference (ITSC); Vienna, Austria; Sep. 13-16, 2005, EEE, Sep. 13, 2005, pp. 602-607, Piscataway, NJ, USA, XP010843091 (six (6) pages).

Flade et al., "Behavior-Based Relative Self-Localization in Intersection Scenarios," 2017 IEEE 20$^{th}$ International Conference on Intelligent Transportation Systems (ITSC), IEEE, Oct. 16, 2017, pp. 1-8, XP033330433 (eight (8) pages).

Franke et al., "Autonomous Driving Goes Downtown," IEEE Expert, IEEE Service Center, Nov. 1, 1998, pp. 40-48, vol. 13, No. 6, New York, NY, US, XP000848997 (nine (9) pages).

Tan et al., "A Radar Guided Vision System for Vehicle Validation and Vehicle Motion Characterization," Intelligent Transportation Systems Conference, 2007. ITSC 2007. IEEE, IEEE, PI, Sep. 2007, pp. 1059-1066, XP031151499 (eight (8) pages).

Guo et al., "Improved Lane Detection based on Past Vehicle Trajectories," 17$^{th}$ International IEEE Conference on Intelligent Transportation Systems (ITSC), IEEE, Oct. 8, 2014, pp. 1956-1963, XP032685535 (eight (8) pages).

Thomas et al., "Grid-based online road model estimation for advanced driver assistance systems," 2015 IEEE Intelligent Vehicles Symposium (IV), IEEE, Jun. 28, 2015, pp. 71-76, XP033209705 (six (6) pages).

Schroedl et al., "Mining GPS Traces for Map Refinement," Data Mining and Knowledge Discovery, Jul. 1, 2004, pp. 59-87, vol. 9, No. 1, Kluwer Academic Publishers, BO, XP019277108 (29 pages).

Damerow et al., "Spatio-Temporal Trajectory Similarity and its Application to Predicting Lack of Interaction in Traffic Situations," 2016 IEEE 19$^{th}$ International Conference on Intelligent Transportation Systems (ITSC), IEEE, Nov. 2016, pp. 2512-2519, XP033028734 (eight (8) pages).

Bartels et al., "Intelligence in the Automobile of the Future," In: "Smart Mobile In-Vehicle Systems," Nov. 5, 2013, pp. 35-46, Springer New York, New York, NY, XP055628438 (12 pages).

Zhang et al., "Using Lane Tracker Data to Improve Lane-level Digital Maps Created With Probe Vehicle Data," Intelligent Transportation Systems, 2003. Proceedings. 2003 IEEE Oct. 12-15, 2003, Oct. 12, 2003, pp. 585-589, vol. 1, Piscataway, NJ, USA, XP010673586 (five (5) pages).

Chen et al., "Probabilistic Modeling of Traffic Lanes from GPS Traces," Advances in Geographic Information Systems, ACM, Nov. 2, 2010, pp. 81-88, XP058229914 (eight (8) pages).

Rogers et al., "Mining GPS Data to Augment Road Models," Proceedings / KDD-99; The Fifth ACM SIGKDD International Conference on Knowledge Discovery and Data Mining: Aug. 15-18, 1999, Aug. 1, 1999, pp. 104-113, XP058254224 (10 pages).

* cited by examiner

METHOD, COMPUTER PROGRAM PRODUCT, AND DRIVER ASSISTANCE SYSTEM FOR DETERMINING ONE OR MORE LANES OF A ROAD IN AN ENVIRONMENT OF A VEHICLE

CROSS REFERENCE TO RELATED APPLICATION

This application claims priority under 35 U.S.C. § 119 from European Patent Application No. 18207969.9, filed Nov. 23, 2018, the entire disclosure of which is herein expressly incorporated by reference.

BACKGROUND AND SUMMARY OF THE INVENTION

The present invention relates to a method, in particular to a computer-implemented method, for determining one or more lanes of a road in an environment of a vehicle. In particular, the present invention relates to a computer program product and a system, in particular a driver assistance system, for determining one or more lanes of a road in an environment of a vehicle.

Autonomous and semi-autonomous driving vehicles are guided by systems that detect the geometry of a lane of a road. The geometry of a lane of a road may be determined using sensors that are able to recognize the boundaries of the lane, for example by detecting the lane markings that demarcate them. Further, the geometry of a lane of a road may be determined using map data. However, map data might not be available in unmapped regions, and is often unreliable in construction areas. In addition, sensors, e.g. camera sensors, may fail to detect the geometry of a lane in bad weather conditions or may fail to detect the geometry of a lane of roads which have no, faded, or false lane markings.

Accordingly, there may be a need for efficiently improving the determination of one or more lanes of a road. In particular, there may be a need for efficiently determining one or more lanes of a road without using map data and/or lane markings of the road.

According to a first aspect of the invention, there is provided a method for determining one or more lanes of a road in an environment of a vehicle. The environment of the vehicle may be an environment in the vicinity of the vehicle which may be observed by one or more sensors of the vehicle. The vehicle may be an autonomous or a semi-autonomous driving vehicle, e.g. an autonomous or a semi-autonomous driving car. The method comprises receiving a plurality of objects in the environment of the vehicle. An object may be a car, a motorcycle, a truck, a bus, a bicycle, and/or any other object using a lane of a road or driving on a lane of a road. The plurality of objects may be detected by one or more sensors of the vehicle. The method receives a plurality of trajectories for the plurality of objects in the environment of the vehicle. Preferably, the plurality of trajectories comprises no trajectory of an object, e.g. when an object is newly detected by the vehicle, or a single trajectory of an object, when the vehicle was able to determine a trajectory for an object, for each object of the plurality of objects.

The method further estimates a shape of a road based on the plurality of trajectories for the plurality of objects, and determines the one or more lanes of the road using the estimated shape of the road and the plurality of objects and/or the plurality of trajectories for the plurality of objects.

This may provide the advantage that a collective driving behavior for a plurality of objects, represented by the plurality of trajectories of the plurality of objects, is used to determine the one or more lanes of the roads. Accordingly, the method is able to efficiently determine the one or more lanes of a road without map data and lane markings of the road. Further, the vehicle may be guided based on the one or more determined lanes even if lane markings are not available and/or cannot be detected. In addition, the one or more lanes of the road are available in heavy traffic conditions or abnormal traffic situations, e.g. road construction, accidents, or other events which may lead to a new lane configuration, where lane markings are not visible to sensors of the vehicle and/or objects in the environment of the vehicle ignore existing lane markings and/or form new lanes independently of the existing lane markings. Accordingly, the determined one or more lanes efficiently adapt to new traffic conditions based in the collective driving behavior of the objects in the vicinity of the vehicle. In other words, the method is more robust to possible changes of lanes and lane configurations of a road.

According to an embodiment of the invention, the plurality of trajectories may comprise a single trajectory for each object of at least a subset of objects, preferably a single trajectory for each object, of the plurality of objects. Advantageously, the one or more lanes may be determined more precisely when a single trajectory of a large subset of objects or all objects of the plurality of objects is available.

According to a further embodiment of the invention, estimating the shape of the road based on the plurality of trajectories may comprise determining a number of segments for the plurality of trajectories, clustering the plurality of the trajectories in each of the one or more segments according to one or more shapes of trajectories of the plurality of trajectories, determining a cluster of trajectories of the clustered plurality of trajectories in each of the one or more segments, wherein the cluster of trajectories comprises a majority of trajectories having an equal or similar shape in a particular segment of the one or more segments, and estimating the shape of the road based on the determined cluster of trajectories in each of the one or more segments. Advantageously, the shape of the road may be estimated more precisely.

According to further embodiment of the invention, each segment may comprise at least a part of a trajectory of the plurality of trajectories. Thus, a segment may define a region of the road for which trajectories have been received. Advantageously, dividing a road in segments based on trajectories may simplify the segmentation of a road in the vicinity of the vehicle.

According to a further embodiment of the invention, the number of segments may be predefined, and/or the number of segments may depend on a number of objects within the plurality of objects, and/or the number of segments may depend on a road type and/or a road length, and/or the number of segments may depend on the environment of the vehicle, and/or the number of segments may depend on available computational capacity of a control unit executing the method. Advantageously, the number of segments may be determined dynamically. Thus, the shape of the road may be estimated more precisely depending on the available computational capacity and/or road-specific or environmental-specific parameters. For example, a large available computational capacity may allow a large number of segments to be computed. Accordingly, this may lead to a more accurate and robust estimation of the shape of the road.

According to a further embodiment of the invention, the shape of the road may be estimated based on the determined cluster of trajectories in each of the one or more segments using a multi-curve fitting function. Advantageously, a single shape of the road may be efficiently determined from the majority of trajectories representing a collective driving behavior of objects in each segment.

According to a further embodiment of the invention, a shape of each lane of the one or more lanes may comprise the estimated shape of the road. Advantageously, a shape of each lane may be determined based on the estimated shape of the road which has been estimated based on the collective driving behavior of the objects in the vicinity of the vehicle.

According to a further embodiment of the invention, two adjacent lanes of the one or more lanes may have a minimum predefined distance. Advantageously, one or more lanes of the road may be determined efficiently.

According to a further embodiment of the invention, determining one or more lanes of the road using the estimated shape of the road and the plurality of objects and/or the plurality of trajectories of the plurality of objects may comprise generating a candidate lane from each trajectory of the plurality of trajectories, wherein a shape of the candidate lane is similar or equal to the estimated shape of the road, and wherein a trajectory of the plurality of trajectories is in the center or within a predefined range around the center of the candidate lane at least in a segment where the shape of the trajectory or the shape of at least a part of the trajectory is similar or equal to the estimated shape of the road, determining one or more sets of lanes from the generated candidate lanes, wherein the set of lanes comprises only lanes from the generated candidate lanes which are distinct to each other, determining a score value for each set of lanes of the determined one or more sets of lanes, wherein the score value is incremented when a trajectory of a particular candidate lane of a set of lanes is in the center or within a predefined range around the center of the particular candidate lane, and determining the one or more lanes of the road based on the set of lanes which has the largest score value. Advantageously, the one or more lanes may be determined more efficiently. In particular, the one or more lanes may be determined robust and/or precise even if no map data and/or lane marking data is available.

According to a further embodiment of the invention, determining one or more lanes of the road using the estimated shape of the road and the plurality of objects and/or the plurality of trajectories of the plurality of objects may further comprise, if a trajectory of an object of the plurality of objects is not included in the plurality of trajectories, generating a candidate lane for the object, wherein a shape of the candidate lane is similar or equal to the estimated shape of the road, and wherein the object of the plurality of objects is in the center or within a predefined range around the center of the candidate lane. Advantageously, newly determined and received objects for which no trajectory is available, may be used to determine a lane of the road. Accordingly, the determination of one or more lanes of a road may adapt fast to newly received objects. The one or more lanes of a road may be determined more accurately and/or robust in dynamic traffic situations.

According to a further embodiment of the invention, the method may further comprise adapting the determined one or more lanes of the road based on a movement of the plurality of objects using a Kalman filter. Advantageously, the dynamic movement of objects may be used to efficiently determine and track the one or more lanes of a road over time.

According to a further aspect of the invention, there is provided a computer program product for determining one or more lanes of a road in an environment of a vehicle, the computer program product, when being executed by a data processor, is adapted for controlling and/or for carrying out the method as described above.

As used herein, reference to a computer program or a computer program product is intended to be equivalent to a reference to a program element and/or to a computer readable medium containing instructions for controlling a computer system to coordinate the performance of the above described method.

The computer program may be implemented as computer readable instruction code in any suitable programming language, such as, for example, JAVA, C++, and may be stored on a computer-readable medium (removable disk, volatile or non-volatile memory, embedded memory/processor, etc.). The instruction code is operable to program a computer or any other programmable device to carry out the intended functions. The computer program may be available from a network, such as the World Wide Web, from which it may be downloaded.

According to a further aspect of the invention, there is provided a driver assistance system for determining one or more lanes of a road in an environment of a vehicle, the driver assistance system comprising a processor configured to perform the method described above.

According to a further aspect of the invention, there is provided a vehicle comprising a driver assistance system described above for determining one or more lanes of a road in an environment of the vehicle.

The invention may be realized by means of a computer program, respectively software. However, the invention may also be realized by means of one or more specific electronic circuits, respectively hardware. Furthermore, the invention may also be realized in a hybrid form, i.e. in a combination of software modules and hardware modules.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

Other objects, advantages and novel features of the present invention will become apparent from the following detailed description of one or more preferred embodiments when considered in conjunction with the accompanying drawings.

DETAILED DESCRIPTION OF THE DRAWINGS

The illustrations in the drawings are schematic. It is noted that in different figures, similar or identical elements are provided with the same reference signs or with reference signs, which are different from the corresponding reference signs only within the first digit.

Figure 1:
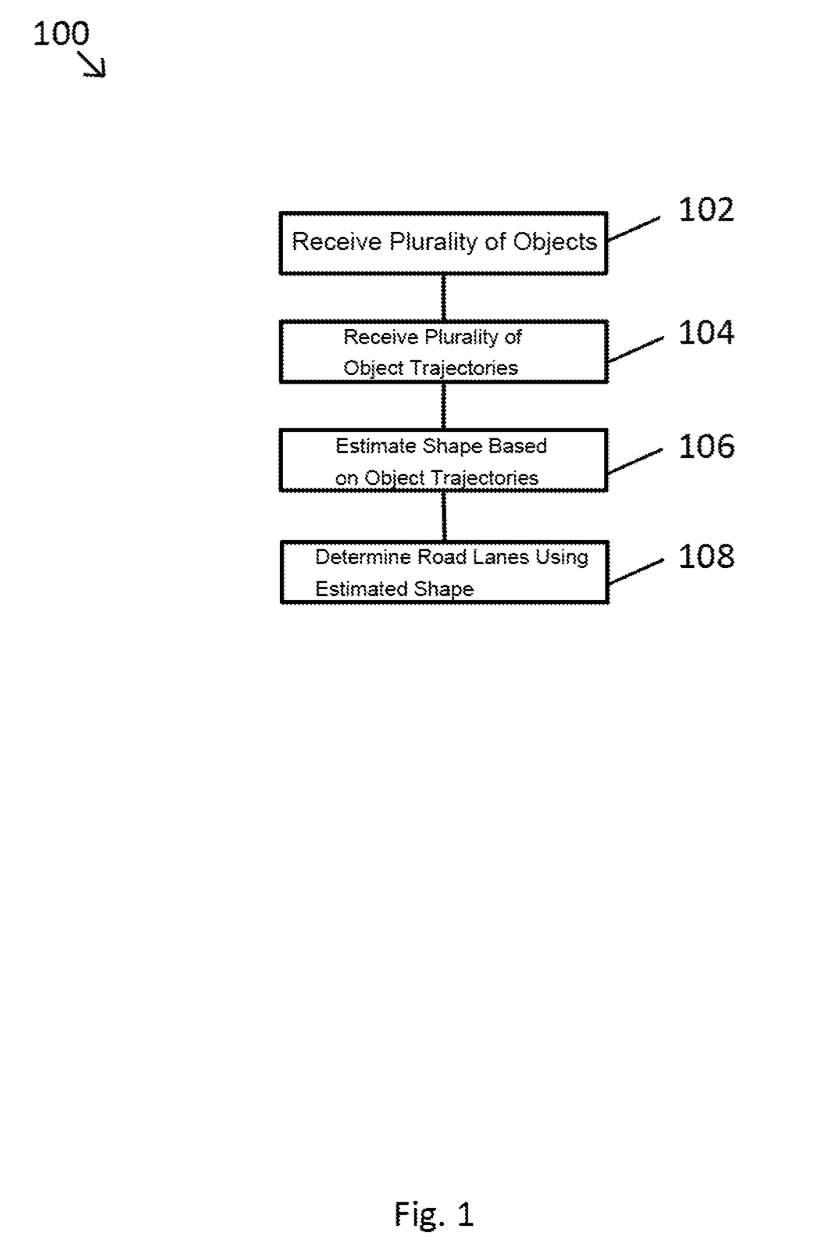
FIG. 1 shows an exemplary method for determining one or more lanes of a road.

FIG. 1 shows an exemplary method 100 for determining one or more lanes of a road in an environment of a vehicle. The method may be executed on a computer or an electronic control unit of the vehicle. The environment of the vehicle may be defined by a sensor detectable area of the vehicle. The method 100 may receive 102 a plurality of objects in the environment of the vehicle. For example, the method 100 may receive 102 the plurality of objects from an object detection component of the vehicle. For example, the method 100 may receive 102 the plurality of object from an environment model of the vehicle. The environment model of the vehicle may be generated by fusing sensor data from one or more sensors of the vehicle.

The method 100 may further comprise receiving 104 a plurality of trajectories for the plurality of objects in the environment of the vehicle. The plurality of trajectories may be received from a trajectory determining component of the vehicle. For example, the plurality of trajectories may be determined by reconstructing a movement profile of the objects in the environment of the vehicle using temporal positions and odometry data of the objects. In other words, the plurality of trajectories may comprise observations regarding a movement of one or more objects of the plurality of objects in the past. The plurality of trajectories may be received from the environmental model of the vehicle.

Furthermore, the method 100 may estimate 106 a shape of the road based on the plurality of trajectories for the plurality of objects. When estimating 106 the shape of the road based on the plurality of trajectories, the method may determine a number of segments for the plurality of trajectories, cluster the plurality of the trajectories in each of the one or more segments according to one or more shapes of trajectories of the plurality of trajectories, determine a cluster of trajectories of the clustered plurality of trajectories in each of the one or more segments, wherein the cluster of trajectories comprises a majority of trajectories having an equal or similar shape in a particular segment of the one or more segments, and estimate the shape of the road based on the determined cluster of trajectories in each of the one or more segments.

Figure 2:
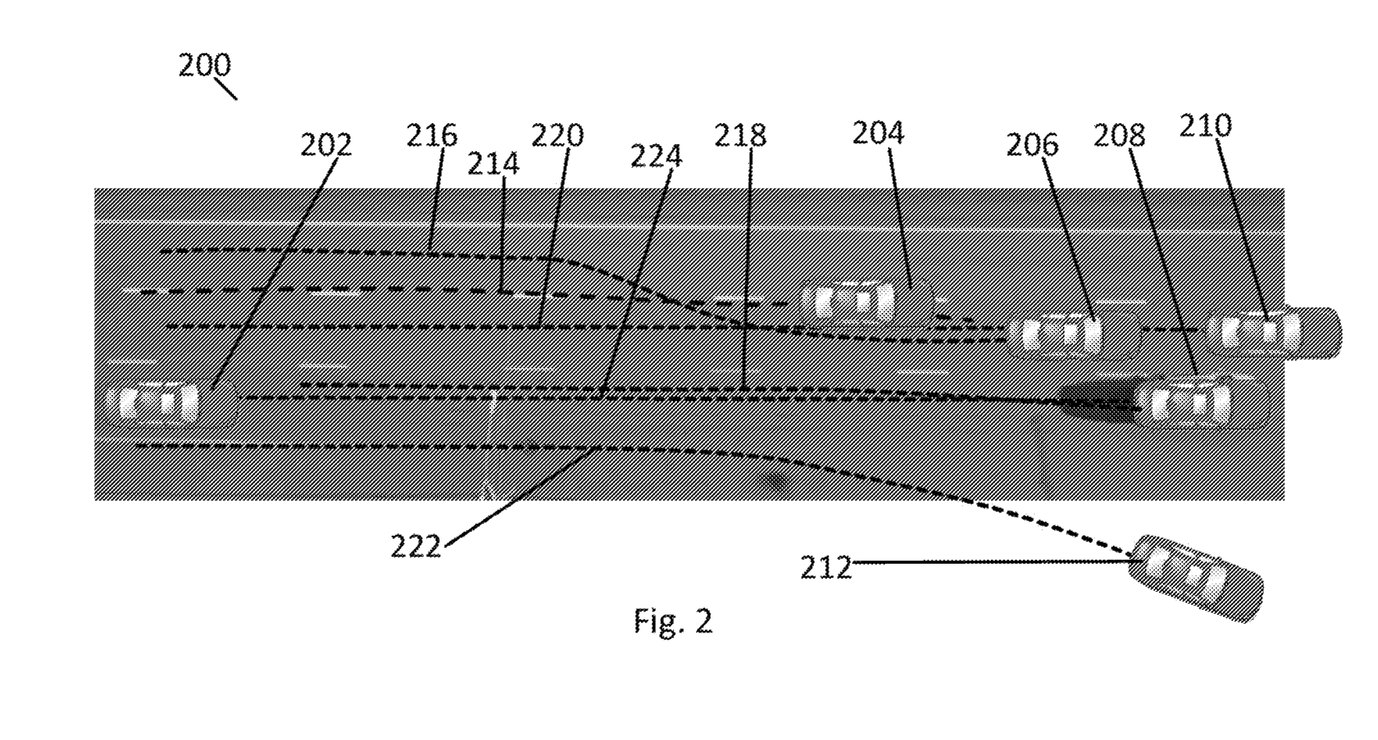
FIG. 2 shows an exemplary traffic scenario of a road.
Figure 3:
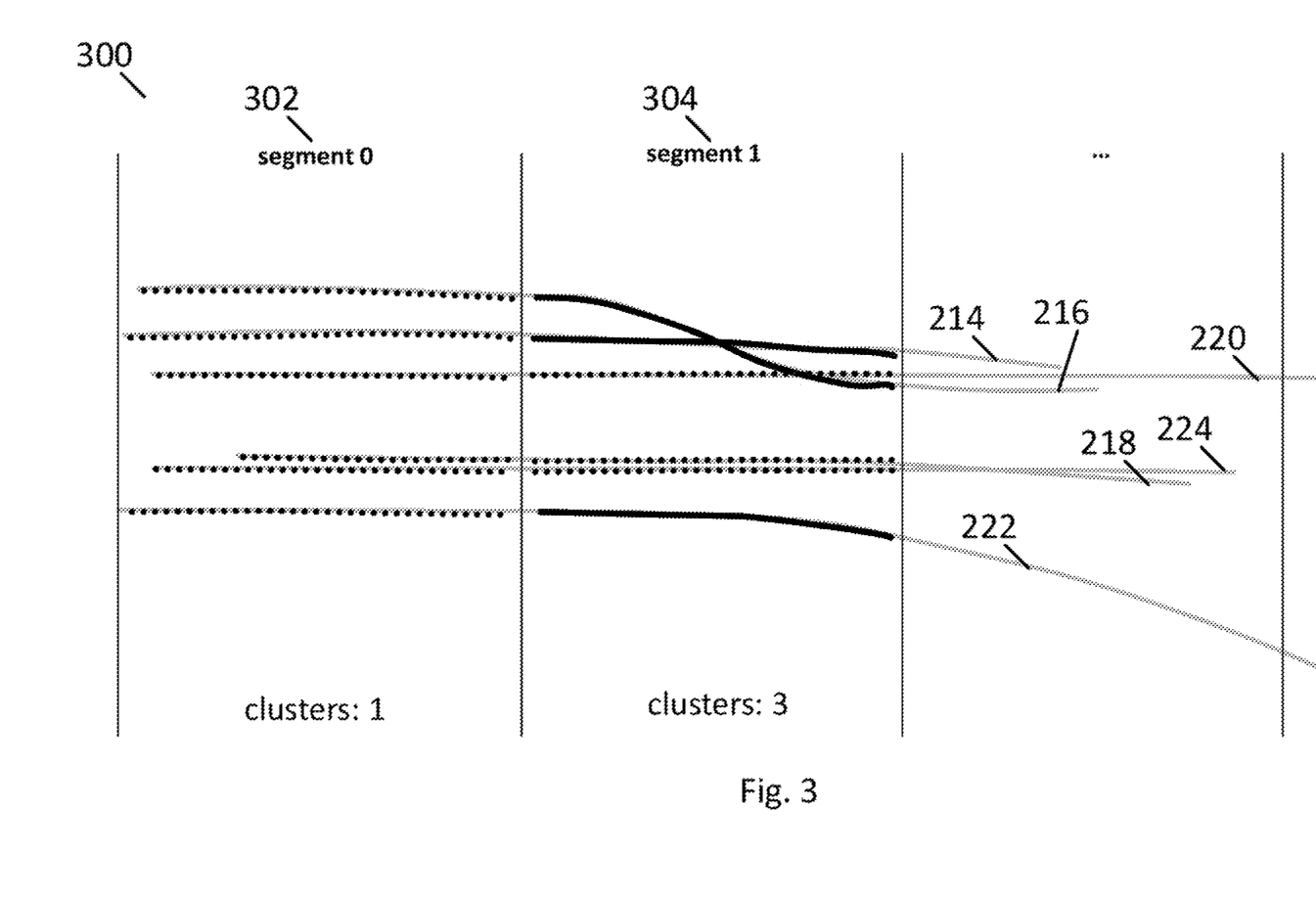
FIG. 3 shows exemplary segments and clusters of a traffic scenario of a road.
Figure 4:
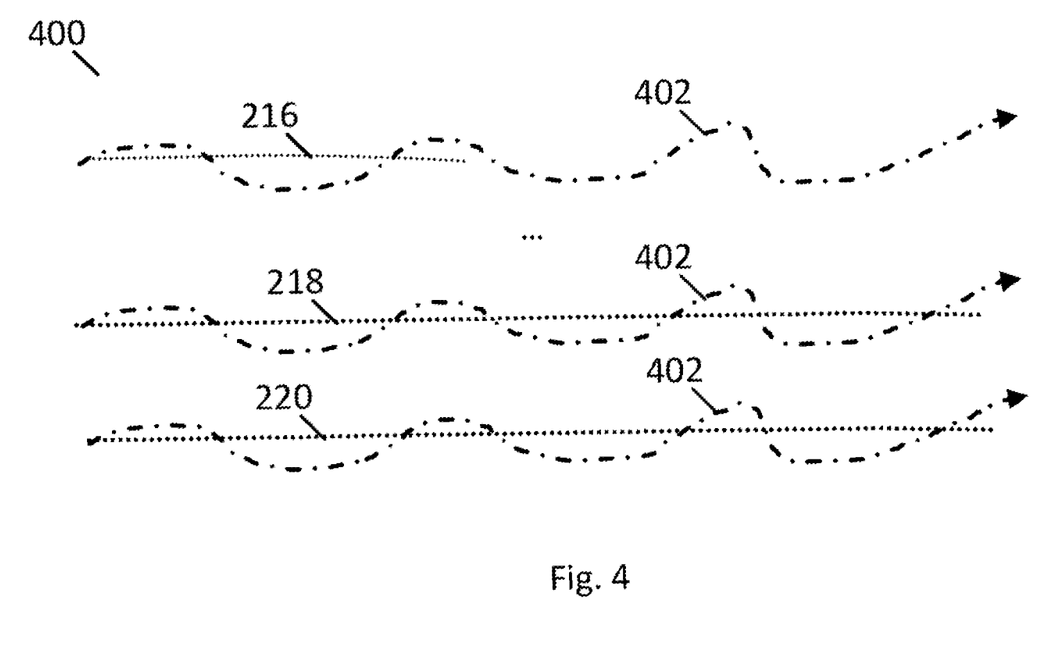
FIG. 4 shows an exemplary multi-curve fitting function to estimate a shape of a road.

FIGS. 2 to 4 show an exemplary estimation of a shape of a road in an environment of the vehicle. In particular, FIG. 2 shows an exemplary traffic scenario 200 of a road, which may be detected by vehicle 202. The vehicle 202 may determine a plurality of vehicles in the environment of the vehicle 202 comprising vehicles 204, 206, 208, 210, and 212. Additionally, the plurality of vehicles may comprise the vehicle 202. The vehicle 202 may further determine a plurality of trajectories corresponding to the vehicle 202 to 212 comprising trajectories 214, 216, 218, 220, 222, and 224. Trajectory 214 may relate to vehicle 204, trajectory 216 may relate to vehicle 206, trajectory 218 may relate to vehicle 208, trajectory 220 may relate to vehicle 210, trajectory 222 may relate to vehicle 212, and trajectory 224 may relate to vehicle 202.

FIG. 3 presents an exemplary segmented clustering 300 of the plurality of trajectories of the exemplary traffic scenario 200 of FIG. 2. In particular, the segmented clustering 300 comprises exemplary segments 302 and 304. Each segment 302, 304 comprises at least parts of one or more trajectories of the plurality of trajectories 214 to 224. For example, segment 302 comprises a part of each trajectory of the plurality of trajectories and segment 304 comprises also a part of each trajectory of the plurality of trajectories. The parts of the trajectories of a particular segment, e.g. segment 302 and segment 304, are clustered according to one or more shapes of the trajectories in the particular segment. As depicted in FIG. 3, segment 302 comprises a single cluster since all trajectories of the segment 302 have a similar or equal shape. Further, the segment 304 comprises three clusters: a first cluster comprising trajectory 216, a second cluster comprising the trajectory 214 and the trajectory 222, and a third cluster comprising the trajectories 218, 220, and 224.

In each segment, a cluster of trajectories may be determined which comprises a majority of trajectories. For example, segment 302 comprises a single cluster of trajectories since all trajectories have a similar or equal shape. Thus, the single cluster of trajectories of the segment 302 comprises the majority of trajectories. The segment 304 has three clusters. The third cluster of trajectories of segment 304 comprises three trajectories and, thus, comprises the majority of trajectories in the segment 304.

To determine whether a shape of a pair of trajectories of a segment is similar or equal, different approaches may be used. For example, a standard deviation between two trajectories may be computed in a distinct region defined by a segment. When the standard deviation is below a predefined threshold, the trajectories are assumed to the similar or equal. Additionally or alternatively, a span of lateral deviations, a longitudinal distance before reaching a particular lateral divergence, a heading angle deviation, or time-warping based measures may be used to determine whether two or more trajectories are similar or equal to each other.

Additionally, a consistency check may be performed when determining the cluster of trajectories of the clustered plurality of trajectories in each of the one or more segments. If a particular segment has a preceding segment, e. g. segment 304 has a preceding segment 302, and the cluster of trajectories of the particular segment comprising the majority of trajectories deviates from or is not consistent with the determined cluster of trajectories of the preceding segment, a cluster of the trajectories of the particular segment may be selected which does not comprise the majority of trajectories. For example, a cluster of trajectories of the particular segment comprising the majority of trajectories might not be consistent with the determined cluster of trajectories of the preceding segment when one or more trajectories of the cluster of the trajectories of the majority of trajectories of the preceding segment are not continued without interruption by one or more trajectories of the cluster of the trajectories comprising the majority of trajectories of the particular segment. In this case, a different cluster of trajectories may be determined for the particular segment which trajectories having a higher continuity as compared to the trajectories of the cluster of trajectories comprising the majority of trajectories of the particular segment.

FIG. 4 shows an exemplary estimation 400 of the shape of the road for the exemplary traffic scenario of FIG. 2 using a multi-curve fitting process. The estimation of the shape of the road is based on the trajectories included in the determined clusters of trajectories of all segments. For example, FIG. 4 shows an exemplary multi-curve fitting function 402 for the parts of the trajectories 216, 218, and 220 which are included in the determined clusters of trajectories. Preferably, the multi-curve fitting function 402 describes a curve that best fits all trajectories included in the determined clusters of trajectories simultaneously. The shape the curve of the multi-curve fitting function may be used to estimate the shape of the road. For example, the shape-approximating curve may be obtained by simultaneously fitting a clothoid function to the trajectories—with a specific lateral offset parameter for each trajectory—using regression methods.

Further, the method 100 may determine 108 the one or more lanes of the road using the estimated shape of the road and the plurality of objects and/or the plurality of trajectories of the plurality of objects. For determining 208 the one or more lanes of the road, the method 200 may generate a candidate lane for each trajectory of the plurality of trajectories, wherein a shape of the candidate lane is similar or equal to the estimated shape of the road, and wherein a trajectory of the plurality of trajectories is in the center or within a predefined range around the center of the candidate lane at least in a segment where the shape of the trajectory is similar or equal to the estimated shape of the road. Further, the method 100 may determine one or more sets of lanes, also named lane configuration in the following, from the generated candidate lanes, wherein the set of lanes comprises only lanes from the generated candidate lanes which are distinct to each other, and determine a score value for each set of lanes of the determined one or more sets of lanes, wherein the score value is incremented when a trajectory of a particular lane of a set of lanes is in the center or within a predefined range around the center of the particular lane. Finally, the method 100 may determine the one or more lanes of the road based on the set of lanes which has the largest score value. The one or more lanes of the road may have the same shape as the estimated shape of the road in the vicinity of the vehicle 202.

Figure 5:
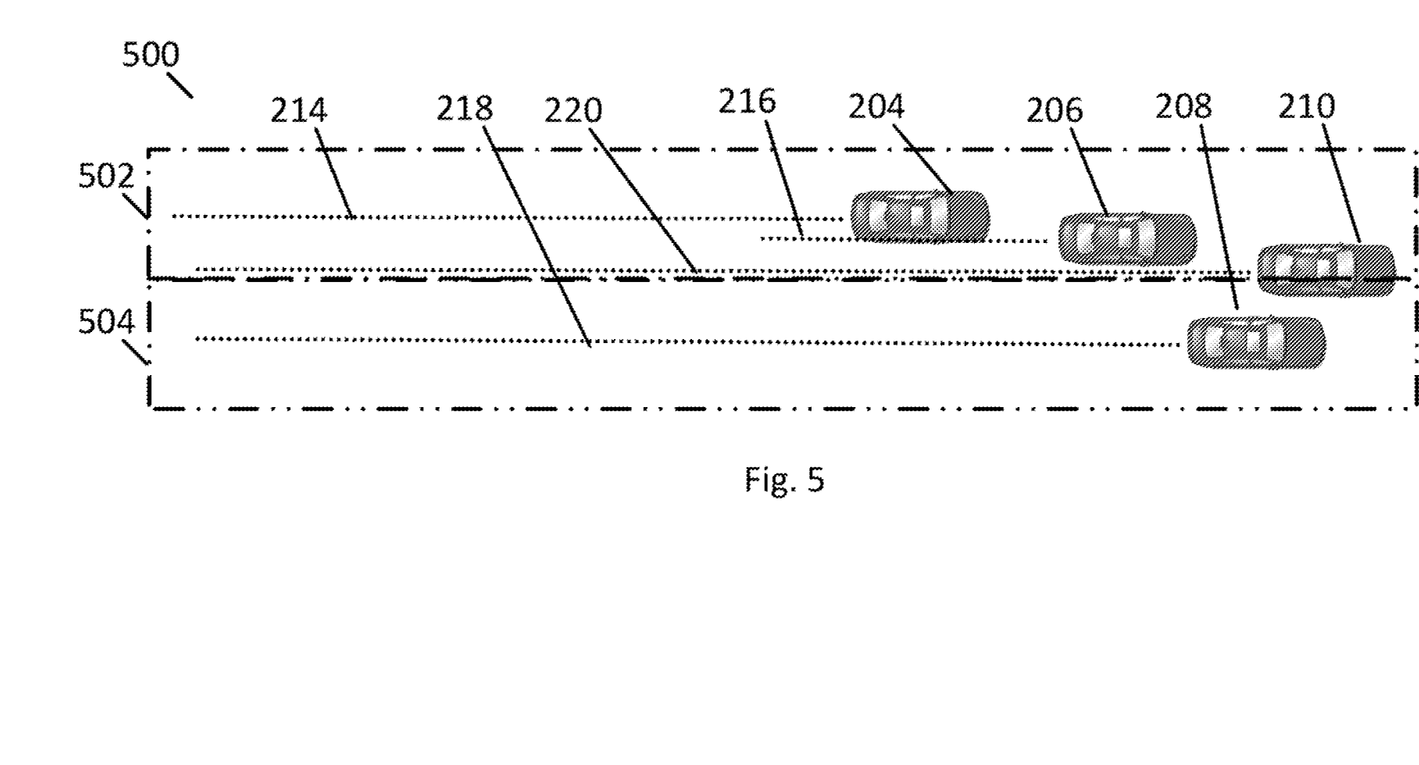
FIG. 5 shows a first example of a lane configuration.
Figure 6:
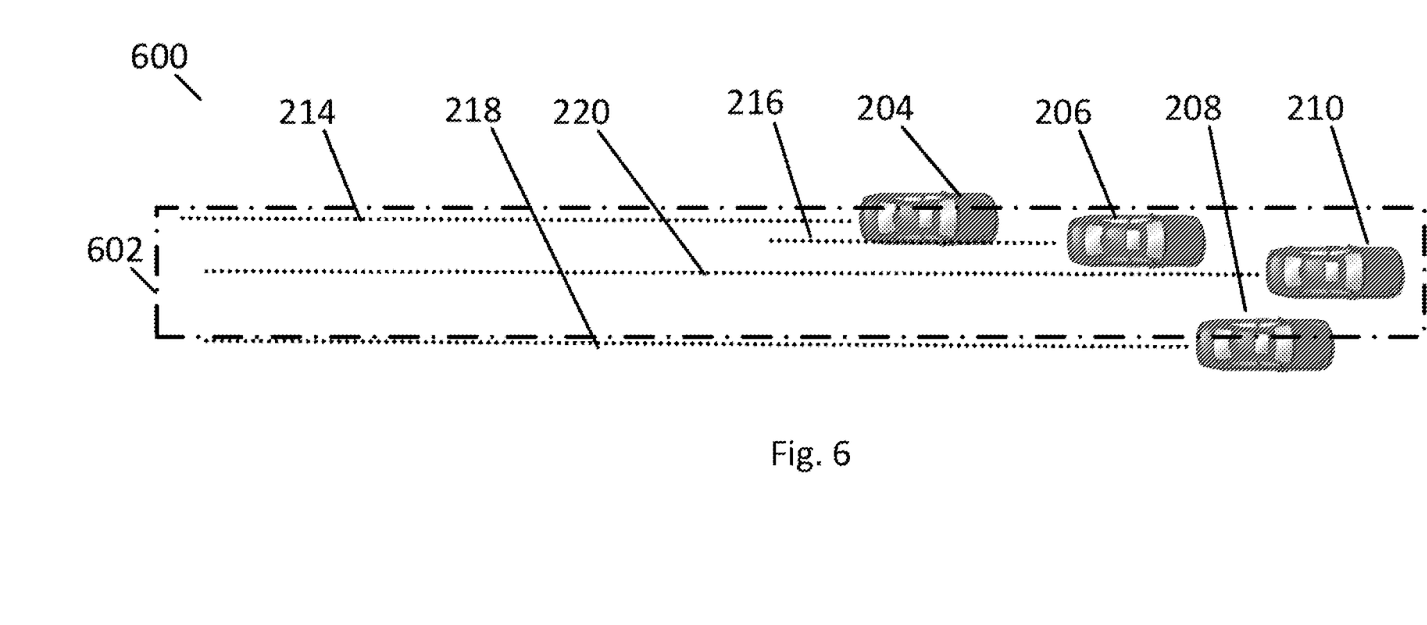
FIG. 6 shows a second example of a lane configuration.
Figure 7:
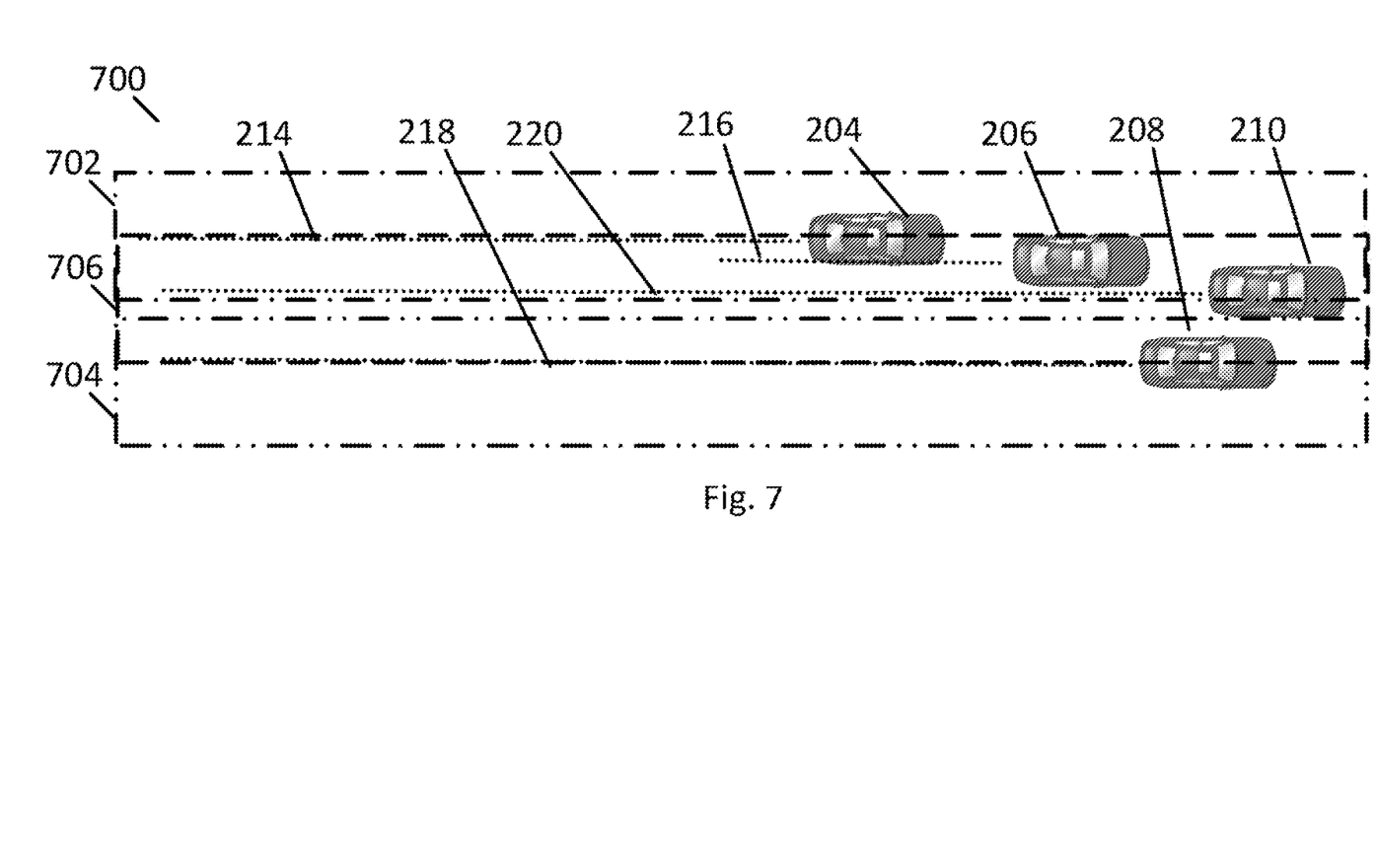
FIG. 7 shows a third example of a lane configuration.

FIGS. 5 to 7 illustrate an exemplary process for determining 108 one or more lanes of the road using the estimated shape of the road, the plurality of objects and the plurality of trajectories of the plurality of objects. In the following, the term lane configuration is used to specify a particular set of one or more lanes, in particular candidate lanes, of the road. In particular, FIG. 5 shows a first example of a lane configuration 500, FIG. 6 shows a second example of a lane configuration 600, and FIG. 7 shows a third example of a lane configuration 700. In general, a lane configuration may fulfil a predefined set of constraints. Preferably, each lane of a lane configuration must have a shape equal to the estimated shape of the road. Further, two adjacent lanes of a lane configuration must be separated by a predefined minimum distance, e.g. 2 meters.

To determine one or more lanes of the road, trajectories of the plurality of trajectories are determined which are at least partially similar or equal to the estimated shape of the road. For each trajectory which is at least partially similar or equal to the estimated shape of the road, a candidate lane is generated. A candidate lane may be a possible lane of the road. A lane configuration comprises one or more candidate lanes. The candidate lane may be taken into account by a lane configuration if the candidate lane fulfils the constraints of a lane configuration as described above. Preferably, a candidate lane is centered on a trajectory of the plurality of trajectories at least in parts where the trajectory is similar or equal to the estimated shape of the road.

As depicted in FIG. 5, the lane configuration 500 may comprise a candidate lane 502 and a candidate lane 504. The candidate lane 502 may be centered on a combination of the trajectory 214 and the trajectory 216. The candidate lane 504 may be centered on the trajectory 218. The candidate lane 502 and the candidate lane 504 share a border against each other. FIG. 6 shows the lane configuration 600 which comprises a single candidate lane 602. The single candidate lane is centered on the trajectory 220. FIG. 7 presents the lane configuration 700, which comprises three candidate lanes: a candidate lane 702 which is centered on the combination of the trajectory 214 and the trajectory 216, a candidate lane 704 which is centered on the trajectory 218, and a candidate lane 706 which is centered on the trajectory 220.

In addition, the method 100 may determine a score value for each set of lanes or lane configuration of the determined one or more sets of lanes or one or more lane configurations. The score value may be incremented when a trajectory of a particular lane of a set of lanes is in the center or within a predefined range around the center of the particular lane, e.g. a particular candidate lane. In other words, the score value defines how many trajectories may be covered by a particular set of lanes or a particular lane configuration. The lane configuration 500 may have a score value of 3 since three trajectories are covered by the candidate lanes 502, 504 of the lane configuration 500. The lane configuration 600 may have a score value of 1 since only one trajectory is covered by the candidate lane 602. The lane configuration 700 may have a score value of 4 since four trajectories are covered by the candidate lanes 702, 704, 706. However, the candidate lanes 702, 704, 706 of the lane configuration 700 overlap, and thus do not fulfil the constraints of a lane configuration. Accordingly, the lane configuration 500 has the largest score value. The method 100 may determine the lanes of the road based on the lane configuration 500 since the lane configuration 500 provides the largest score value.

Advantageously, lanes of a road may be determined using the trajectories of the objects describing a collective behavior of the objects in the vicinity of a vehicle. This allows the use of (semi-)autonomous driving features of the vehicle to continue operation when lane detection systems based on the identification of lane markings would no longer be available. Further, the method may allow (semi-)autonomous driving systems to evaluate the quality of the data provided by markings-based lane-detection systems. In addition, the method may efficiently support driver assistance systems. For example, if it is observed that a majority of objects are curving to the right, the driver assistance system may use this information to infer the presence and geometry of the lanes when no further information regarding the lanes of the road is available.

Exemplary Application Scenarios of the Method

The method as described above may determine one or more lanes of a road. The determined lanes of the road may be used by different driver assistance systems to provide more robust driver assistance systems having high availability in complex, high traffic scenarios. For example, the determined lanes of the road from the collective behavior of the vehicles surrounding the ego vehicle may be used to directly control the vehicle for active lane keeping functions. The ego vehicle may imitate a swarm behavior in active lane keeping functions. Further, the determined lanes of the road from the collective behavior may be used to assign the objects to the determined lanes or order the objects using the determined lanes. This may be used to determine which objects on the road are in the same line as the ego vehicle. Accordingly, the method may be used to determine which vehicles on the road are relevant for adaptive cruise control, short ACC, systems. More specifically, the method may be used to determine which vehicles on the road should be considered relevant when controlling longitudinal dynamics, e.g. acceleration, deceleration, and breaking, of the ego vehicle. Furthermore, the determined lanes of the road may be used to classify how other objects are maneuvering, e.g. how other objects are changing lanes of the road, cancelling a lane change or exiting the road. The ego vehicle may use this information to perform its own maneuvers, e.g. accelerate and/or decelerate to perform a lane change, and/or accelerate and/or decelerate to cancel a lane change.

It should be noted that the term "comprising" does not exclude other elements or steps and the use of articles "a" or "an" does not exclude a plurality. Also elements described in association with different embodiments may be combined. It should also be noted that reference signs in the claims should not be construed as limiting the scope of the claims.

LIST OF REFERENCE SIGNS 100 method
102 receiving a plurality of objects
104 receiving a plurality of trajectories
106 estimate a shape of the road
108 determine one or more lanes of the road
200 traffic scenario
202 vehicle
204 object
206 object
208 object
210 object
212 object
214 trajectory
216 trajectory
218 trajectory
220 trajectory
222 trajectory
224 trajectory
300 exemplary segments and cluster
302 segment
304 segment
400 exemplary multi-curve fitting function
402 multi-curve fitting function
500 first lane configuration
502 candidate lane
504 candidate lane
600 second lane configuration
602 candidate lane
700 third lane configuration
702 candidate lane
704 candidate lane
706 candidate lane The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for determining one or more lanes of a road in an environment of a vehicle, the method comprising:

receiving a plurality of objects in the environment of the vehicle;
receiving a plurality of trajectories for the plurality of objects in the environment of the vehicle;
estimating a shape of the road based on the plurality of trajectories for the plurality of objects, wherein the shape of the road is estimated based on a multi-curve fitting function that describes a curve that best fits all trajectories included in a determined cluster of the plurality of trajectories simultaneously;
determining the one or more lanes of the road using the estimated shape of the road and the plurality of objects and/or the plurality of determining the one or more lanes of the road using the estimated shape of the road and the plurality of objects and/or the plurality of trajectories of the plurality of objects; and guiding the vehicle based on the one or more determined lanes,
wherein determining the one or more lanes of the road using the estimated shape of the road and the plurality of objects and/or the plurality of trajectories of the plurality of objects comprises:
generating a candidate lane for each trajectory of the plurality of trajectories, wherein a shape of the candidate lane is equal to the estimated shape of the road, and wherein a trajectory of the plurality of trajectories is in the center or within a predefined range around the center of the candidate lane at least in a segment where the shape of the trajectory is equal to the estimated shape of the road;
determining one or more sets of lanes from the generated candidate lanes, wherein each of the set of lanes comprises only lanes from the generated candidate lanes which are distinct with respect to each other;
determining a score value for each set of lanes of the determined one or more sets of lanes by counting a number of trajectories that are in the center or within a predefined range around the center of a particular lane within the set of lanes; and
determining the one or more lanes of the road based on the set of lanes which has the largest score value.

2. The method according to claim 1, wherein
the plurality of trajectories comprises a single trajectory for each object of at least a subset of objects of the plurality of objects.

3. The method according to claim 1, wherein the step of estimating the shape of the road based on the plurality of trajectories comprises:
determining a number of segments for the plurality of trajectories;
clustering the plurality of the trajectories in each of the one or more segments according to one or more shapes of trajectories of the plurality of trajectories;
determining a cluster of trajectories of the clustered plurality of trajectories in each of the one or more segments, wherein the cluster of trajectories comprises a majority of trajectories having an equal or similar shape in a particular segment of the one or more segments; and
estimating the shape of the road based on the determined cluster of trajectories in each of the one or more segments.

4. The method according to claim 3, wherein
each segment comprises at least a part of a trajectory of the plurality of trajectories.

5. The method according to claim 3, wherein one or more of:
the number of segments is predefined;
the number of segments depends on a number of objects within the plurality of objects;

the number of segments depends on a road type and/or a road length;

the number of segments depends on the environment of the vehicle; and the number of segments depends on available computational capacity of a control unit executing the method.

6. The method according to claim 1, wherein a shape of each lane of the one or more lanes comprises the estimated shape of the road.

7. The method according to claim 1, wherein two adjacent lanes of the one or more lanes have a minimum predefined distance.

8. The method according to claim 1, the method further comprising:

adapting the determined one or more lines of the road based on a movement of the plurality of objects using a Kalman filter.

9. A driver assistance system of a vehicle for determining one or more lanes of a road in an environment of the vehicle, comprising:

a processor and associated memory configured to execute the acts of:

receiving a plurality of objects in the environment of the vehicle;

receiving a plurality of trajectories for the plurality of objects in the environment of the vehicle;

estimating a shape of the road based on the plurality of trajectories for the plurality of objects, wherein the shape of the road is estimated based on a multi-curve fitting function that describes a curve that best fits all trajectories included in a determined cluster of the plurality of trajectories simultaneously;

determining the one or more lanes of the road using the estimated shape of the road and the plurality of objects and/or the plurality of determining the one or more lanes of the road using the estimated shape of the road and the plurality of objects and/or the plurality of trajectories of the plurality of objects; and guiding the vehicle based on the one or more determined lanes, wherein determining the one or more lanes of the road using the estimated shape of the road and the plurality of objects and/or the plurality of trajectories of the plurality of objects comprises:

generating a candidate lane for each trajectory of the plurality of trajectories, wherein a shape of the candidate lane is equal to the estimated shape of the road, and wherein a trajectory of the plurality of trajectories is in the center or within a predefined range around the center of the candidate lane at least in a segment where the shape of the trajectory is equal to the estimated shape of the road;

determining one or more sets of lanes from the generated candidate lanes, wherein each of the set of lanes comprises only lanes from the generated candidate lanes which are distinct with respect to each other;

determining a score value for each set of lanes of the determined one or more sets of lanes by counting a number of trajectories that are in the center or within a predefined range around the center of a particular lane within the set of lanes; and determining the one or more lanes of the road based on the set of lanes which has the largest score value.

10. A vehicle comprising a driver assistance system according to claim 9.

11. The method according to claim 1, wherein the curve is obtained by simultaneously fitting a clothoid function to the trajectories in the determined cluster of the plurality of trajectories.

12. The method according to claim 11, wherein the clothoid function includes a lateral offset parameter for each trajectory in the determined cluster of the plurality of trajectories.

13. A method for determining one or more lanes of a road in an environment of a vehicle, the method comprising:

receiving a plurality of objects in the environment of the vehicle;

receiving a plurality of trajectories for the plurality of objects in the environment of the vehicle;

estimating a shape of the road based on the plurality of trajectories for the plurality of objects, wherein the shape of the road is estimated based on a multi-curve fitting function that describes a curve that best fits all trajectories included in a determined cluster of the plurality of trajectories simultaneously; and determining the one or more lanes of the road using the estimated shape of the road and the plurality of objects and/or the plurality of determining the one or more lanes of the road using the estimated shape of the road and the plurality of objects and/or the plurality of trajectories of the plurality of objects; and guiding the vehicle based on the one or more determined lanes, wherein the curve is obtained by simultaneously fitting a clothoid function to the trajectories in the determined cluster of the plurality of trajectories.

14. The method according to claim 13, wherein the clothoid function includes a lateral offset parameter for each trajectory in the determined cluster of the plurality of trajectories.

* * * * *